United States Patent
Boeffel

(10) Patent No.: US 7,218,490 B2
(45) Date of Patent: May 15, 2007

(54) PROCESS AND DEVICE FOR DETERMINING A RUN-AWAY CONDITION OF A ROTATION-SPEED CONTROLLED, PERMANENT-EXCITED SYNCHRONOUS MOTOR

(75) Inventor: Walter Boeffel, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 712 days.

(21) Appl. No.: 10/462,300

(22) Filed: Jun. 13, 2003

(65) Prior Publication Data

US 2004/0001291 A1    Jan. 1, 2004

(30) Foreign Application Priority Data

Jun. 27, 2002    (DE) ................. 102 28 824

(51) Int. Cl.
*H02H 3/00* (2006.01)
(52) U.S. Cl. ............................................... 361/51
(58) Field of Classification Search ............ 361/51
See application file for complete search history.

(56) References Cited

U.S. PATENT DOCUMENTS 3,144,917 A * 8/1964 Tressel ................. 187/290
6,014,307 A * 1/2000 Crimmins ................. 361/170

FOREIGN PATENT DOCUMENTS

| DE | 43 30 823 | 3/1995 |
|---|---|---|
| DE | 44 32 058 | 3/1996 |
| JP | 05008962 | 1/1993 |

* cited by examiner

*Primary Examiner*—Ronald W. Leja
(74) *Attorney, Agent, or Firm*—Henry M. Feiereisen

(57) ABSTRACT

A process and device for determining a run-away condition of a rotation-speed controlled, permanent-excited synchronous motor are described. The process continuously checks, when a rotation speed controller is active and for a predetermined constant rotation speed setpoint, several conditions, either alone or in combination, and generates an error signal if the particular condition or the combination of conditions, when continuously checked, is/are always satisfied during at least a predetermined time interval. These conditions include: determining if the magnitude of a measured deviation in the rotation speed between a measured actual rotation speed value and the predetermined constant rotation speed setpoint increases or reaches a limit value; if the magnitude of a control variable present at the output of a rotation speed controller increases or reaches a limit value; and if the magnitude of a measured acceleration value and/or the magnitude of a torque-producing current increases or reaches a limit value.

17 Claims, 2 Drawing Sheets

PROCESS AND DEVICE FOR DETERMINING A RUN-AWAY CONDITION OF A ROTATION-SPEED CONTROLLED, PERMANENT-EXCITED SYNCHRONOUS MOTOR

CROSS-REFERENCES TO RELATED APPLICATIONS

This application claims the priority of German Patent Application, Ser. No. 102 28 824.0, filed Jun. 27, 2002, pursuant to 35 U.S.C. 119(a)–(d), the disclosure of which is incorporated herein by reference.

BACKGROUND OF THE INVENTION

The present invention relates to a a process for determining a run-away condition of a rotation-speed controlled, permanent-excited synchronous motor and to a device for carrying out the process.

Rotation-speed controlled, permanent-excited synchronous motors are commercially available. Certain procedures are implemented that can be used to identify the correct pole position of the permanent-excited pole rotor for commutating the synchronous motor. All these procedures are relatively reliable and accurate. However, commutation errors can occasionally occur which can cause the rotation-speed controlled, permanent-excited synchronous motor to run away. Synchronous motors in that run away can damage or destroy a production machine or machine-tool in which the synchronous motor is installed.

Although commutation errors occur very rarely, they have to be prevented at all cost because of the potential for consequential damages. A commutation error can have many causes which depend on the components which cooperate with the drive. It is therefore not sufficient to merely analyze the errors that have occurred in the past.

To this date, the rotation speed controller of the rotation-speed controlled, permanent-excited synchronous motor is monitored to determine if the rotation speed controller has reached a limit setting. It can be safely assumed that a fault has occurred when a maximum or minimal controlling variable is generated at the output of the rotation speed controller during a predetermined time interval. The predetermined time interval is typically preset at the factory to, for example, approximately 100 msec, and the length of this time interval can be increased by a user. However, it is impossible to determine from the error signal the reason why the rotation speed controller has reached the limit setting. There can be numerous reasons why the rotation speed controller has reached the limit setting. Of these reasons, only one represents a commutation error that can cause the rotation-speed controlled, permanent-excited synchronous motor to run away.

A commutation error may already have accelerated a load to a high speed after the expiration of the predetermined time period, depending on the inertial mass of a connected load. If an error message is generated, a converter connected to the rotation-speed controlled, permanent-excited synchronous motor is switched off by a conventional pulse blocking device. Depending on the existing friction, the load then coasts to a stop. If the load was already accelerated to a high speed during the predetermined time period, then the pulse blocking device can no longer prevent a crash. For this reason, production machines and machine tools are protected by a limiter in form of a buffer that intercepts a load that coasts to a stop.

It would therefore be desirable and advantageous to provide an improved process and device for determining a run-away condition of a rotation-speed controlled, permanent-excited synchronous motor, which obviates prior art shortcomings and is able to specifically bring the motor and an associated drive to a safe stop.

SUMMARY OF THE INVENTION

According to one aspect of the invention, a process for determining a run-away condition of a rotation-speed controlled, permanent-excited synchronous motor continuously checks, when a rotation speed controller is active and for a predetermined constant rotation speed setpoint, if the magnitude of a measured deviation in the rotation speed between a measured actual rotation speed value and the predetermined constant rotation speed setpoint increases or reaches a limit value, and generates an error signal if a particular condition, when continuously checked, is always satisfied during at least a predetermined time interval.

According to another aspect of the invention, the afore-described process continuously checks alternatively or in addition if the magnitude of a control variable present at the output of a rotation speed controller increases or reaches a limit value. According to yet another aspect of the invention, the process continuously checks alternatively or in addition if the magnitude of a measured acceleration value and/or the magnitude of a torque-producing current increases or reaches a limit value.

The disclosed processes of the invention have in common that from a certain point in time on, starting when the rotation speed controller is activated, when an optionally installed brake is released and when a predetermined constant rotation speed setpoint is applied, the corresponding process checks if a condition is fulfilled for a predetermined time. Is this condition is only fulfilled during a short time interval, i.e., not as long as the entire predetermined time interval, then it can be assumed that the motor did not run away. If the condition is fulfilled at least for as long as the predetermined time interval, then an error message is generated that the rotation-speed controlled, permanent-excited synchronous motor has run away. This message deactivates the activated rotation speed controller. Checking this condition requires only a fraction of the time interval that has been set at the factory in converters for monitoring the condition "rotation speed controller at limit setting." The particular signals that are already available and the signals that can be formed from the available signals alone determine the signal whose value is checked by the rotation speed controller.

According to yet another aspect of the invention, a device for determining a run-away condition of a rotation-speed controlled, permanent-excited synchronous motor, includes a computing device having at least one input and an output, a rotation speed controller having an activation input and an output, with the output of the rotation speed controller providing a signal to at least one input of the computing device, and a controller having an input and an output, with the input being connected to the output of the computing device and the output being connected to the activation input of the rotation speed controller. The rotation speed controller is set to a predetermined constant rotation speed setpoint and, when activated, constantly checks if at least one, or a subset with more than one, of the following conditions is satisfied during at least a predetermined time interval:

(a) a signal representing a rotation speed difference between a measured actual rotation speed value and the predetermined constant rotation speed setpoint increases or reaches a limit value;

(b) a signal representing the magnitude of a control variable present at the output of the rotation speed controller increases or reaches a limit value;

(c) a signal representing the magnitude of a measured acceleration value increases or reaches a limit value, and (d) a signal representing the magnitude of a torque-producing current of the motor increases or reaches a limit value.

The computing device generates—if one or more of the conditions, either alone or in combination, are satisfied—an error signal which causes the controller to deactivate the rotation speed controller in order to bring the motor to a stop.

According to an advantageous feature of the invention, at least two of the aforedescribed conditions can be linked by a logical AND-operation and the resulting truth table is monitored. The active rotation speed controller is deactivated only after the result of the logical AND-operation is found to be true during a predetermined time interval. According to the invention, the result of the logical AND-operation can be monitored several times which enhances the reliability of the process.

According to another advantageous feature of the invention, checks are performed quite frequently, so that the runaway condition is considered to be fulfilled even if the condition is not fulfilled at a certain instance, but was fulfilled during previous checks (debouncing and/or filtering). The activated rotation speed controller is then deactivated even if the runaway condition was not fulfilled during a brief time interval. A runaway condition can be reliably recognized by repeatedly executing one or more logical AND operations, since otherwise a disturbance may not deactivate the rotation speed controller. This increases the robustness of the process of the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
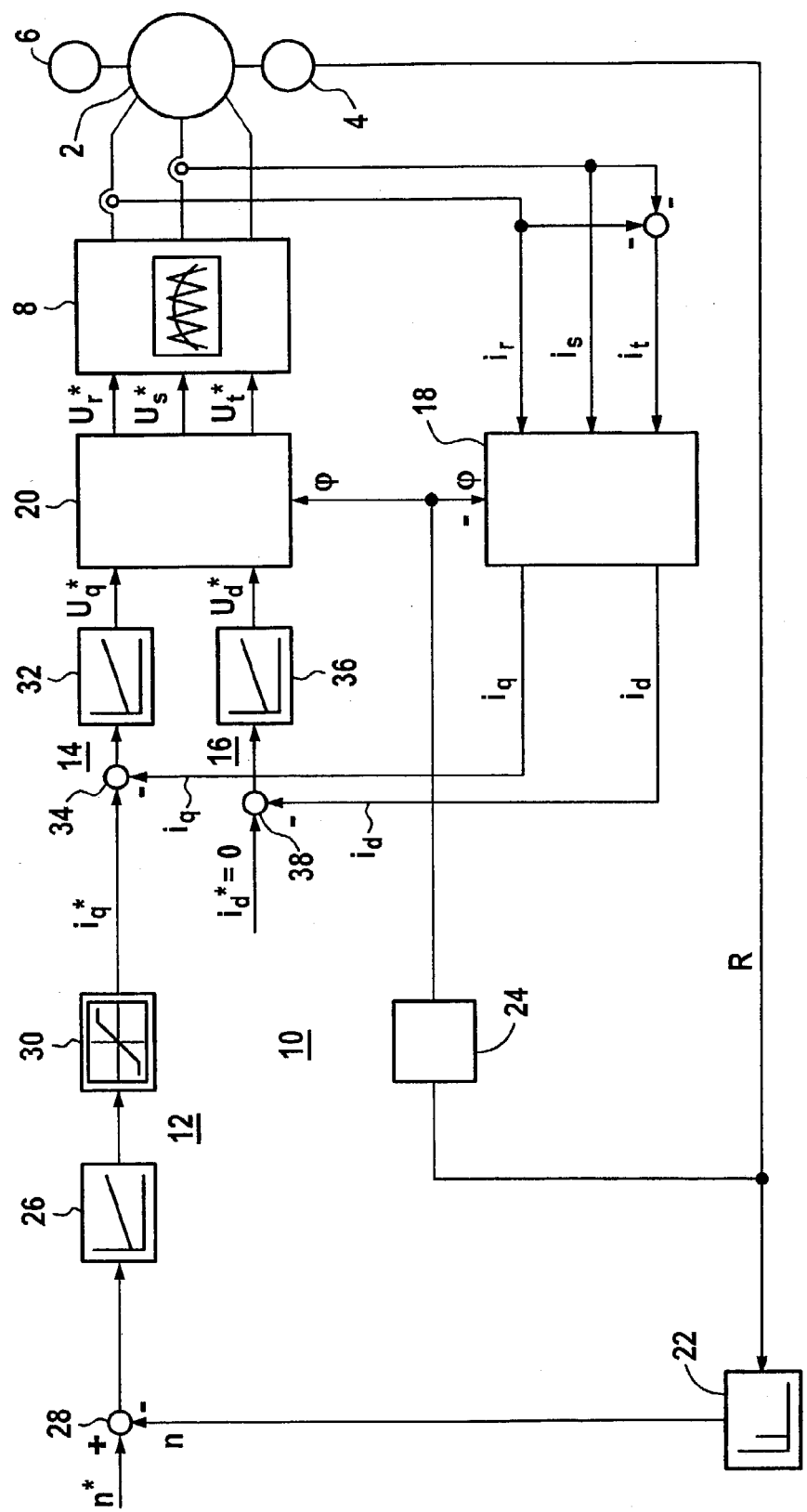
FIG. 1 shows a control structure of a conventional controller for a permanent-excited synchronous motor.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a permanent-excited synchronous motor 2, with a rotor position sensor 4, a brake 6, a converter 8, in particular an intermediate voltage converter, and a conventional field control 10. The stator of the permanent-excited synchronous motor is powered by the converter 8. The conventional field control 10 includes a rotation speed control circuit 12, two current control circuits 14, 16 as well as two conversion circuits 18 and 20. The field control 10 also includes a differentiating circuit 22 and a conversion device 24.

The rotation speed control circuit 12 includes a rotation speed controller 26, a comparator 28 and a limiter 30. A predetermined rotation speed setpoint n* is applied to the non-inverting input of the comparator 28, whereas a measured actual rotation speed value n is applied to the inverting input. The actual rotation speed value n is generated by the differentiating circuit 22 from the position signal R generated by the rotor position sensor 4. The output of the comparator 28 is connected to an input of the rotation speed controller 26, with the output of the rotation speed controller 26 being connected to the limiter 30. The output of the limiter 30 produces the setpoint signal $i^*_q$ of the secondary current control circuit 14.

The current control circuit 14 includes a comparator 34 and a current controller 32 connected to an output of the comparator 34. A second current control circuit 16 also includes a comparator 38 and current controller 36 connected to an output of the comparator 38. The outputs of the two current control circuits 14 and 16 are connected to corresponding inputs of a conversion circuit 20 which converts the two orthogonal setpoints $U^*_q$ and $U^*_d$ of the field voltage into three voltage setpoints $U^*_r$, $U^*_s$ and $U^*_t$ for the stator. The voltages $U^*_r$, $U^*_s$ and $U^*_t$ represent the voltage setpoints of the permanent-excited synchronous motor.

The stator currents $i_r$ and $i_s$ of the permanent-excited synchronous motor 2 are measured, and an input-side conversion circuit 18 converts the stator currents $i_r$ and $i_s$ into two orthogonal field current components $i_q$ and $i_d$ of a stator current space vector of the synchronous motor 2. The current components $i_q$ and $i_d$ are supplied to corresponding inverting inputs of the comparators 34 and 36 of the two current control circuits 14 and 16, as described above. The current component $i_q$, which is also referred to as a torque-forming current, is applied to the inverting input of the comparator 34. A setpoint of the current component $i_d$, which is also referred to as a flux-forming current component and has a value of zero, is applied to the non-inverting input of the comparator 38. Each of the two conversion circuits 18 and 20 requires information about the rotor position angle φ, which is generated by the conversion device 24 from the rotor position signal R of the rotor position sensor 4.

Figure 2:
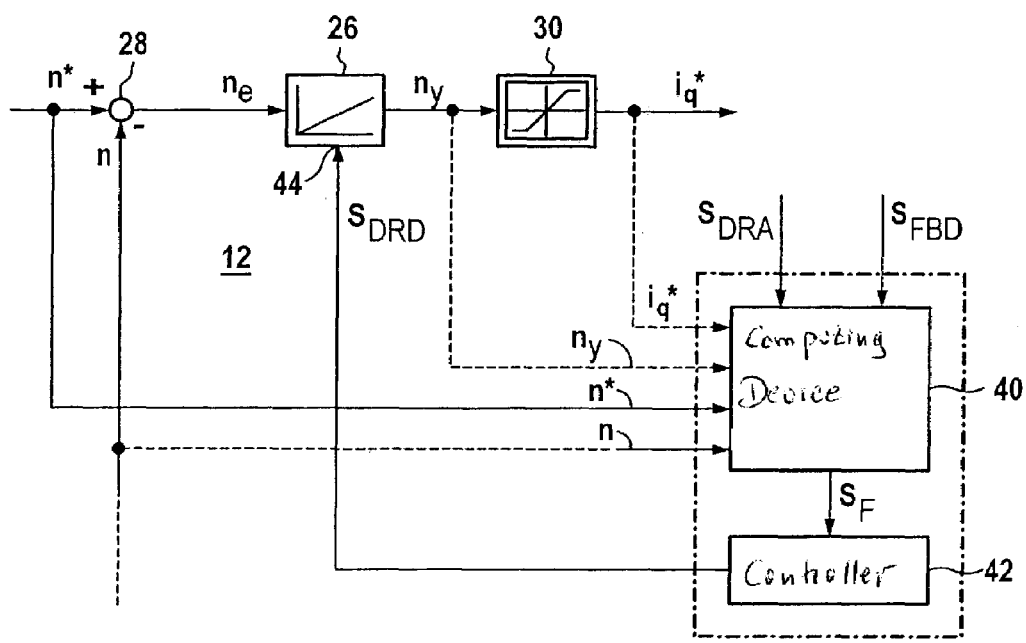
FIG. 2 shows a device for carrying out the process according to the invention.

For sake of clarity, FIG. 2 shows only the rotation speed control circuit 12 of the control system 10 depicted in FIG. 1. A computing device 40 and a controller 42 is associated with the rotation speed control circuit 12. The input of the controller 42 is connected with the output of the computing device 40, whereas the output of the controller 42 is connected with an activation input 44 of the rotation speed controller 26. The computing device 40 and the controller 42 can be implemented as a single assembly, in particular as a signal processor. This is indicated by the dash-dotted line. The input of the computing device 40 is connected to the output of the rotation speed controller 26 and to the output of the limiter 30. In addition, the rotation speed setpoint n* and the actual value n of the rotation speed are supplied to the computing device 40. Two release signals $S_{DRA}$ and $S_{FBD}$ are also supplied to the computing device 40. Not all the input signals n, $n_y$ and i*q have to be used.

According to the invention, only a single input signal has to be present. The aforementioned input signals can be arranged into a subset in any desired combination. A commonality between all the described processes of the invention have are two release signals $S_{DRA}$ and $S_{FBD}$ and the rotation speed setpoint n*, which is set to a predetermined value, in particular a value of zero. The release signal $S_{DRA}$ indicates that the rotation speed controller 26 is active, whereas the release signal $S_{FBD}$ indicates that a brake 6 of the permanent-excited synchronous motor 2 is deactivated. An error signal $S_F$, which activates the controller 42, is provided at the output of the computing device 40. The activated controller 42 uses the control signal $S_{DRD}$ to deactivate the rotation speed controller 26, so that the converter 8 is disconnected from the synchronous motor 2 by blocking the pulses.

FIG. 2 described in more detail the operation of the process of the invention for determining a runaway condition of a rotation speed-controlled permanent-excited synchronous motor 2 with a brake 6.

One characteristic feature of a runaway condition of a drive, which consists of the permanent-excited synchronous motor 2 and the converter 8 supplying power, is that the loop gain of the rotation speed control circuit 12 becomes negative. In other words, while the rotation speed controller 26 attempts to decrease a deviation $n_e$ by a controlling variable $n_y$, the deviation $n_e$ actually increases as a result of the negative loop gain. The deviation $n_e$ increases with an increase of the controlling variable $n_y$. This is also referred to as an unstable closed-loop control circuit.

If one assumes that the rotation speed control circuit 12 is not subjected to disturbances, then the actual rotation speed value n will continue to move away from the rotation speed setpoint n* in spite of the intervention of the rotation speed controller 26. This can be described as follows:

1) For a constant rotation speed setpoint n*, the deviation $n_e$ increases, i.e., the first time derivative of the deviation $n_e$ does not change its mathematical sign;
2) The acceleration (first derivative of the actual rotation speed value n) continues to increase and/or
3) The numerical value of the acceleration is identical to a predetermined limit value (a maximum or minimum value);
4) Moreover, the controlling variable $n_y$ at the output of the rotation speed controller 26 increases, or
5) Has already reached a predetermined limit value (maximum or minimum value).

The temporal changes of the aforedescribed signals of the rotation speed control circuit 12 only appear in the described form, if the rotation speed setpoint n* is constant, in particular zero, during a predetermined time interval, during which the check(s) is/are performed. The check(s) is/are performed only when the rotation speed controller 26 is activated, i.e., when the rotation speed controller 26 is engaged and the brake 6 of the permanent-excited synchronous motor 2 is not active. The result "motor runs away" is not affected, if only one signal of the rotation speed control circuit 12 or a combination of a subset of these signals is checked or if all signals are checked. However, the process according to the invention becomes more reliable. The deviation $n_e$ of the rotation speed control circuit 12 need not be measured, but is calculated in the computing device 40 depending on the predetermined rotation speed setpoint n* and the determined actual rotation speed value n. The generated setpoint i*q can also be used for the underlying current control circuit 14 instead of the controlling variable $n_y$ of the rotation speed control circuit 12.

The process of the invention is started when the release signals $S_{DRA}$ and $S_{FBD}$ indicate that the rotation speed controller 26 is active and that a brake 6 is deactivated. It is also indicated that the rotation speed setpoint n* is constant, in particular zero. In addition, one or all conditions linked by a logical AND-operation are fulfilled for the first time. A predetermined time interval starts when the signals $S_{DRA}$ and $S_{FBD}$ are present and all logical AND-conditions are fulfilled. After this time interval has started, it is monitored that all AND-conditions are fulfilled. Monitoring ends as soon as one condition is no longer fulfilled, i.e. the activated time interval is deactivated. If all AND-conditions were satisfied during the entire time interval, then an error signal $S_F$ is generated which indicates that the drive is running away. Depending on this error signal $S_F$, the rotation speed controller 26 is deactivated which causes a pulse blocking signal to block the converter 8. In addition, the underlying cause for the error "motor running away" is displayed. A rotating load then coasts to a stop in a timely fashion as a result of pulse blocking and friction, so that the load comes to stop in due course before the machine hits a limit setting. Since checking one or more conditions requires only a few sampling steps, a drive can be switched off before a runaway condition develops.

The process of the invention hence not only determines the cause, namely a commutation error, but simultaneously also the effect (runaway of the drive due to a commutation error). The process of the invention is fast enough to allow one or more AND-conditions to be checked several times during the predetermined time interval. This eliminates disturbances, since such disturbances never occur synchronous in time. If one of several AND-conditions are fulfilled several times, then the results of each check are temporarily stored to allow a comparison between the results. A result caused by a disturbance can be identified, so that a disturbance does not prevent a drive that actually runs away from being identified. This significantly enhances the robustness of the process of the invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A process for determining a run-away condition of a rotation-speed controlled, permanent-excited synchronous motor with a holding brake, comprising the steps of:
   monitoring from a time when a rotation speed controller is activated and the holding brake is released and at a zero rotation speed setpoint if the magnitude of a measured deviation in the rotation speed between a measured actual rotation speed value and the predetermined zero rotation speed setpoint increases or reaches a limit value; and
   generating an error signal if the magnitude increases or reaches the limit value during at least a predetermined time interval, said error signal indicating that the motor is in a runaway condition.

2. The process of claim 1, and further comprising deactivating the rotation speed controller of the motor when the error signal is present.

3. A process for determining a run-away condition of a rotation-speed controlled, permanent-excited synchronous motor with a holding brake, comprising the steps of:
   monitoring from a time when a rotation speed controller is activated and the holding brake is released and at a zero rotation speed setpoint if the magnitude of a control variable present at an output of a rotation speed controller increases or reaches a limit value; and generating an error signal if the magnitude increases or reaches the limit value during at least a predetermined time interval, said error signal indicating that the motor is in a runaway condition.

4. The process of claim 3, and further comprising deactivating the rotation speed controller of the motor when the error signal is present.

5. A process for determining a run-away condition of a rotation-speed controlled, permanent-excited synchronous motor with a holding brake, comprising the steps of:

monitoring from a time when a rotation speed controller is activated and the holding brake is released and at a zero rotation speed setpoint if the magnitude of a measured acceleration value increases or reaches a limit value; and generating an error signal if the magnitude increases or reaches the limit value during at least a predetermined time interval, said error signal indicating that the motor is in a runaway condition.

6. The process of claim 5, and further comprising deactivating the rotation speed controller of the motor when the error signal is present.

7. A process for determining a run-away condition of a rotation-speed controlled, permanent-excited synchronous motor with a holding brake, comprising the steps of:

monitoring from a time when a rotation speed controller is activated and the holding brake is released and at a zero rotation speed setpoint if the magnitude of a torque-producing current increases or reaches a limit value; and generating an error signal if the magnitude increases or reaches the limit value during at least a predetermined time interval, said error signal indicating that the motor is in a runaway condition.

8. The process of claim 7, and further comprising deactivating the rotation speed controller of the motor when the error signal is present.

9. A process for determining a run-away condition of a rotation-speed controlled, permanent-excited synchronous motor with a holding brake, comprising the steps of:

when a rotation speed controller is activated and the holding brake is released and the motor is at a zero rotation speed setpoint, performing a logical AND-operation between at least two of the following conditions:

(a) a signal representing a rotation speed between a measured actual rotation speed value and the predetermined zero rotation speed setpoint increases or reaches a limit value;

(b) a signal representing the magnitude of a control variable present at an output of the rotation speed controller increases or reaches a limit value;

(c) a signal representing the magnitude of a measured acceleration value increases or reaches a limit value, and (d) a signal representing the magnitude of a torque-producing current increases or reaches a limit value; and if the logical AND-operation produces a logical value "TRUE" between the at least two conditions during at least a predetermined time interval, generating an error signal, said error signal indicating that the motor is in a runaway condition.

10. The process of claim 9, and further comprising deactivating the rotation speed controller of the motor when the error signal is present.

11. A process for determining a run-away condition of a rotation-speed controlled, permanent-excited synchronous motor with a holding brake, comprising the steps of:

when a rotation speed controller is activated and the holding brake is released and the motor is at a zero rotation speed setpoint, monitoring if at least one of the following conditions is satisfied during a current time interval and during at least one previous predetermined time interval:

(a) a signal representing a rotation speed difference between a measured actual rotation speed value and the predetermined zero rotation speed setpoint increases or reaches a limit value;

(b) a signal representing the magnitude of a control variable present at an output of the rotation speed controller increases or reaches a limit value;

(c) a signal representing the magnitude of a measured acceleration value increases or reaches a limit value, and (d) a signal representing the magnitude of a torque-producing current increases or reaches a limit value; and generating an error signal if one or more of the conditions are satisfied during the current time interval and the at least one predetermined time interval, said error signal indicating that the motor is in a runaway condition.

12. The process of claim 11, wherein the signals producing the conditions are filtered.

13. The process of claim 11, and further comprising deactivating the rotation speed controller of the motor when the error signal is present.

14. A device for determining a run-away condition of a rotation-speed controlled, permanent-excited synchronous motor with a holding brake, comprising:

a computing device having at least one input and an output;

a rotation speed controller having an activation input and an output, with the output of the rotation speed controller providing a signal to an input of the computing device; and a controller having an input and an output, with the input being connected to the output of the computing device and the output being connected to the activation input of the rotation speed controller;

wherein the rotation speed controller is set to a zero rotation speed setpoint and monitors when the holding brake is released if at least one of the following conditions is satisfied during at least a predetermined time interval:

(a) a signal representing a rotation speed difference between a measured actual rotation speed value and the zero rotation speed setpoint increases or reaches a limit value;

(b) a signal representing the magnitude of a control variable present at the output of the rotation speed controller increases or reaches a limit value;

(c) a signal representing the magnitude of a measured acceleration value increases or reaches a limit value, and (d) a signal representing the magnitude of a torque-producing current of the motor increases or reaches a limit value; and wherein the computing device generates—if one or more of the conditions are satisfied—an error signal which causes the controller to deactivate the rotation speed controller in order to bring the motor to a stop.

15. The device of claim 14, wherein the computing device and the controller are implemented as an assembly.

16. The device of claim 15, wherein the assembly comprises a signal processor.

17. The device of claim 14, further comprising a converter supplying electric power to the synchronous motor, wherein the converter is disconnected from the synchronous motor when the rotation speed controller is deactivated.

* * * * *